No. 796,552. PATENTED AUG. 8, 1905.
P. S. BAUER.
LIGATURE CONTAINER.
APPLICATION FILED AUG. 27, 1904.
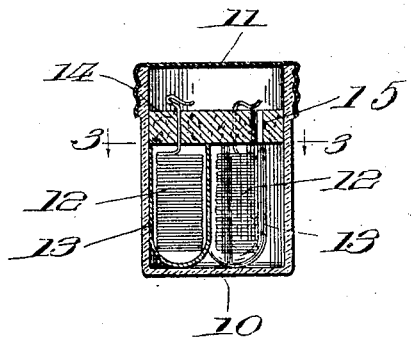
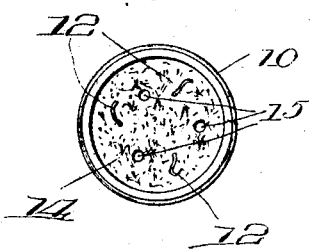 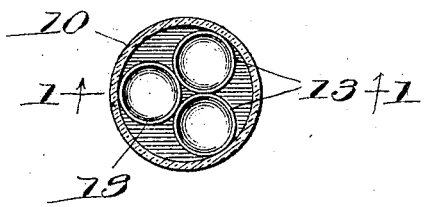
Witnesses:
H. S. Gaither
M. A. Kiddig
Inventor:
Perry S. Bauer
by Wm. Belt
Attorney

UNITED STATES PATENT OFFICE.

PERRY S. BAUER, OF CHICAGO, ILLINOIS, ASSIGNOR TO BAUER & BLACK, OF CHICAGO, ILLINOIS, A CORPORATION OF ILLINOIS.

LIGATURE-CONTAINER.

No. 796,552.     Specification of Letters Patent.     Patented Aug. 8, 1905.

Application filed August 27, 1904. Serial No. 222,476.

*To all whom it may concern:*

Be it known that I, PERRY S. BAUER, a citizen of the United States, residing at Chicago, in the county of Cook and State of Illinois, have invented new and useful Improvements in Ligature-Containers, of which the following is a specification.

The object of this invention is to provide a container of simple and inexpensive construction for holding ligatures and which requires a comparatively small amount of alcohol or other preservative.

In the accompanying drawings I have illustrated one manner of embodying the invention, and referring thereto—

Figure 1 is a sectional view on the line 1 1 of Fig. 3. Fig. 2 is a top plan view with the cover removed. Fig. 3 is a sectional view on the line 3 3 of Fig. 1.

The container is preferably made of glass, circular in shape, and comprises a body 10 and a suitable cover 11, which is adapted to be screwed or otherwise securely fastened in place on the body. The ligatures 12 are arranged in individual compartments within the body. These compartments can be conveniently formed by means of cups 13, arranged side by side within and extending lengthwise of the body beneath a guide 14, which is preferably made of cork and fitted snugly within the body somewhat below the top thereof and against the upper ends of the cups. These cups are preferably made of glass, open at their upper ends and closed at their lower ends, and are proportioned in size to fit snugly in the body and are held in fixed position by the guide. The ligatures, rolled or coiled or in any other suitable form, are inclosed in the cups, one in each, and wholly separated from each other, and their ends extend up through openings in the guide and rest in the space above the guide within the body. Sufficient alcohol is put in the container to immerse the ligatures in the cups and the ends extending above the guide, and owing to the close fit of the parts and the very little loss of space a comparatively small quantity of alcohol is required.

The cups and the body can be made of any desired length or diameter; but I have found that by constructing the container and arranging the ligature in this manner I am able to preserve the ligatures with a very small quantity of alcohol. The container is compact in form and holds the ligatures separated from each other, so that they will not become entangled or displaced. While I have shown only three compartments in the single embodiment of the invention chosen for illustration, it will be apparent that any suitable number may be provided, and they may be disposed around the center of the body, as shown, or around a central compartment located in the body. The body may be made in other shapes, and the compartments may be fitted in the body regardless of their particular position. The guide is provided with one or more openings, such as 15, so that the alcohol can be poured in after the ligatures and guide have been arranged in the body and so that the body may then be filled with alcohol to a level above the guide.

Without limiting myself to the exact construction, proportion, and arrangement of parts herein shown and described, what I claim, and desire to secure by Letters Patent, is—

1. A container for two or more ligatures comprising a body and a separate compartment in said body for each ligature.

2. A ligature-container comprising a body and individual compartments located side by side and extending lengthwise in said body for the ligatures.

3. A ligature-container comprising a body, individual compartments in said body for the ligatures and terminating below the top of the body, and a guide arranged within the body to close the upper ends of the compartments.

4. A ligature-container comprising a body, and individual cups in the body for holding the ligatures.

5. A ligature-container comprising a body, individual cups for the ligatures arranged side by side in the body, and means for holding the cups in place.

6. A ligature-container comprising a body, individual cups for the ligatures arranged side by side in the body, said cups being closed at the bottom and open at the top, and a guide fitted in the body against the top of the cups and provided with openings through which the ligatures are drawn.

PERRY S. BAUER.

Witnesses:
    WM. O. BELT,
    M. A. KIDDIE.